United States Patent [19]

Hashimoto et al.

[11] Patent Number: 4,813,629
[45] Date of Patent: Mar. 21, 1989

[54] FISHING REEL HAVING A WATERPROOF DRAG MECHANISM

[75] Inventors: Hiroshi Hashimoto; Nobuyuki Yamaguchi, both of Tokyo, Japan

[73] Assignee: Daiwa Seiko, Inc., Higashikurume, Japan

[21] Appl. No.: 164,335

[22] Filed: Mar. 4, 1988

[30] Foreign Application Priority Data

Mar. 6, 1987 [JP] Japan .................................. 62-32748
Mar. 6, 1987 [JP] Japan .................................. 62-32749

[51] Int. Cl.⁴ ............................................ A01K 89/015
[52] U.S. Cl. .................................... 242/217; 242/221
[58] Field of Search ............... 242/218, 217, 84.5 R, 242/84.51 R, 84.5 A, 84.51 A, 84.5 P

[56] References Cited

U.S. PATENT DOCUMENTS

| | | | |
|---|---|---|---|
| 1,005,154 | 10/1911 | Catucci | 242/84.5 R |
| 2,462,365 | 2/1949 | Crawford | 242/84.51 R |
| 3,478,979 | 11/1969 | Henze | 242/216 |
| 4,681,276 | 7/1987 | Sato | 242/217 X |
| 4,742,974 | 5/1988 | Furomoto | 242/217 |

FOREIGN PATENT DOCUMENTS

| | | |
|---|---|---|
| 5190373 | 6/1984 | Japan . |
| 59-90374 | 6/1984 | Japan . |
| 60-156964 | 10/1985 | Japan . |
| 61-80669 | 5/1986 | Japan . |

*Primary Examiner*—Stuart S. Levy
*Assistant Examiner*—Katherine Matecki
*Attorney, Agent, or Firm*—Cushman, Darby & Cushman

[57] ABSTRACT

A fishing reel with a drag mechanism having a spool shaft fitted with a spool which can be optionally slid in the axial direction of the spool shaft by an operating lever provided at a side plate of the fishing reel. A braking disk is provided on the spool shaft which is rotated together with a pinion engaged with a driving gear on a handle shaft. A waterproofing cover, in which the braking disk is housed in a waterproof manner, is provided rotatably and slidably disposed relative to the braking disk. A braking member, which can be optionally brought into pressure contact with the braking disk, is provided in the waterproofing cover. The outside surface of the waterproofing cover faces the side surface of the spool so that the outside surface can be optionally coupled to the side surface.

12 Claims, 3 Drawing Sheets

FISHING REEL HAVING A WATERPROOF DRAG MECHANISM

BACKGROUND OF THE INVENTION

The present device relates to an improved, waterproof drag mechanism for a fishing reel having a spool shaft which is supported at both ends.

If sea water or the like comes into contact with the braking member of a drag mechanism for a fishing reel having a spool shaft supported at both ends, the drag function and durability of the drag mechanism are adversely affected.

It is known that in order to prevent failure, a cylindrical member is disposed to extend from the outer circumferential edge of a spool and is provided with a waterproofing cover covering a braking section. Such a fishing reel is disclosed in the Japanese Utility Model Application (OPI) No. 80669/86 (the term "OPI" as used herein means an "unexamined published application"). However, since there is a gap in the known device between the waterproofing cover and the spool shaft, sea water or the like cannot be completely prevented from coming in. The waterproofing function of the known fishing reel is insufficient, particularly when water is directly poured onto the reel to wash it or the reel is accidentally dropped into water.

Since the waterproofing cover is provided at the outer circumferential edge of the spool, the spool is made large and heavy as a whole. For that reason, the rotational inertia of the spool is so high as to make backlash likely to occur at the time of unwinding of a fish line. This deteriorates the casting performance of the fishing reel. These are drawbacks solved by the present invention.

Accordingly, it is an object of the present device to provide a drag mechanism for a fishing reel having a spool shaft supported at both ends which is completely isolated and protected from sea water.

It is a further object to prevent the drag function from failing, and durability of the drag mechanism from decreasing due to moisture such as the sea water or the like.

It is yet another object of the present invention to prevent the rotational inertia of the spool from being increased by providing means for preventing the failure of the drag function and decrease in durability of the drag mechanism.

It is a still further object of the invention to prevent backlash from occurring at the time of unwinding of a fish line.

SUMMARY OF THE INVENTION

In accordance with there has been provided a fishing reel having a waterproof drag mechanism. The reel comprises a spool shaft having a length, first and second ends and defining an axial direction along the length. First means are provided for rotatably supporting both ends of the shaft. Second means are provided for displacing the shaft in the axial direction. A spool is provided for having fishing line wound thereon having two sides and fixed to the shaft. A handle is provided along with means for operably connecting the handle to the shaft, whereby torque is transmitted from the handle to the shaft. A braking member is fixed to the shaft adjacent one side of the spool. A waterproofing member axially-displaceably and rotatably, but watertightly disposed on the axle is provided for sealing the braking member from exposure to water. The waterproofing member has a surface adjacent the one side of the spool for engaging the spool. The means for displacing the shaft is operable from a first position wherein the spool rotates with the shaft, to a second position wherein the waterproofing member engages the one side of the spool and rotates with the spool, to a third position wherein said braking member engages said waterproofing member.

Preferably, the braking member comprises a disk having a periphery, fixed to the shaft at an intermediate point on the shaft, displaced from one side of the spool, radiating out from the axle, and having a braking surface for engaging the waterproofing member when the axle is in the third position.

In a preferred embodiment, the waterproofing member comprises a pan-shaped member rotatably and watertightly disposed on the axle between the braking member and the spool, having a surface for engaging the braking surface when said axle is in the third position, and having means for watertightly sealing the braking surface while allow free relative rotation between the braking member and the waterproofing member.

Most preferably, the means for watertightly sealing comprises a lid-shaped member rotatably and watertightly disposed on the axle and fixed to the pan-shaped member, wherein the braking member is freely rotatable within a watertight space defined by the lid-shaped and pan-shaped members when the axle is in the first and second positions.

Further objects, features and advantages of the present invention will become apparent from the description of preferred embodiments which follows, when considered together with the attached figures of drawing.

DESCRIPTION OF THE PREFERRED EMBODIMENTS

In the fishing reel of the present invention, there has been provided a drag mechanism comprising a spool shaft fitted with a spool which can be optionally slid in the axial direction of the spool shaft by an operating lever provided at a side plate of the fishing reel. A braking disk is provided on the spool shaft which is rotated together with a pinion engaged with a driving gear on a handle shaft. A waterproofing cover, in which the braking disk is housed in a waterproof manner, is provided rotatably and slidably disposed relative to the braking disk. A braking member, which can be optionally brought into pressure contact with the braking disk, is provided in the waterproofing cover. The outside surface of the waterproofing cover faces the side surface of the spool so that the outside surface can be optionally coupled to the side surface.

Figure 1:
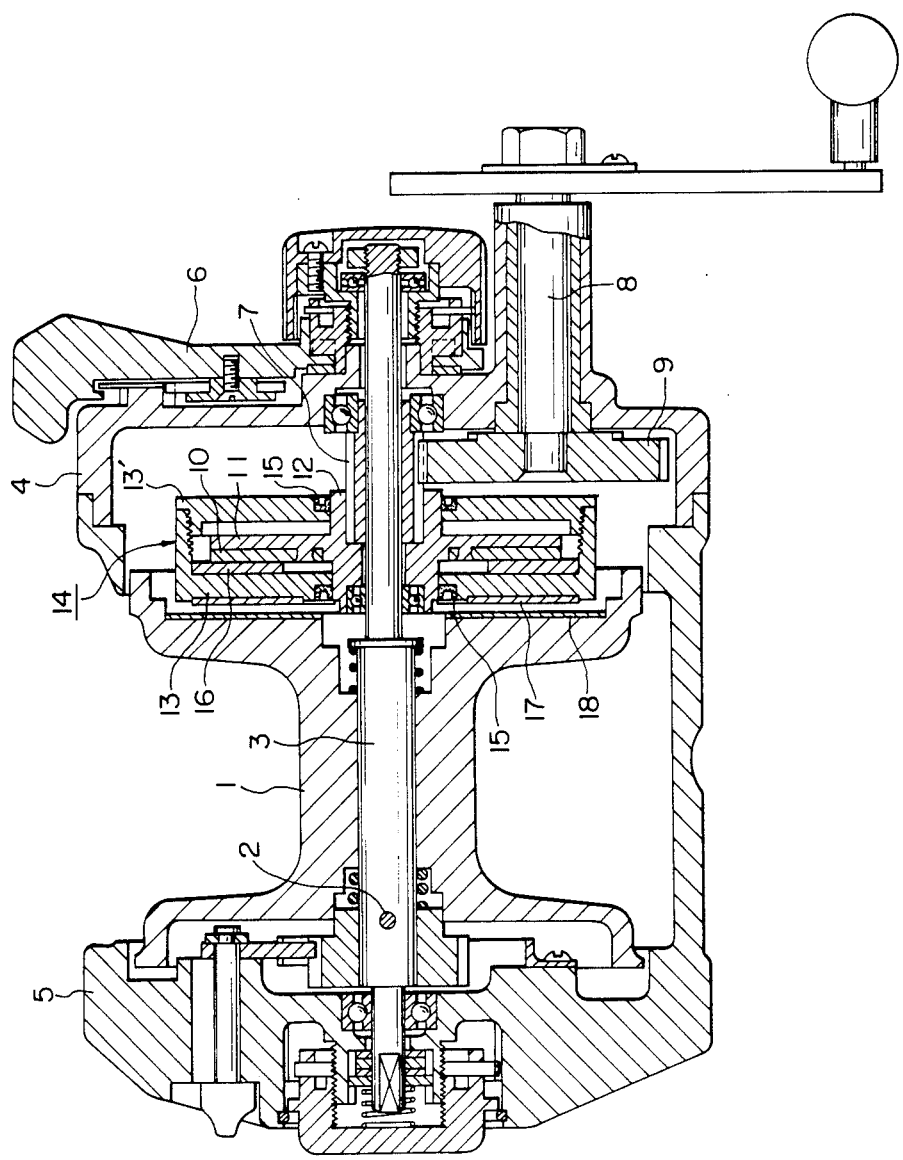
FIG. 1 shows a longitudinally sectional view of a preferred embodiment of the present device.

An embodiment of the present device, which is a drag mechanism for a fishing reel having a spool shaft supported at both its ends, is hereafter described with reference to the attached drawings. As is seen in FIG. 1, a spool 1 is fitted on the spool shaft 3 and coupled thereto by a pin 2 so that the spool and the spool shaft are rotated together. The spool shaft 3 is supported between the side plates 4 and 5 of the fishing reel The length of shaft 3 defines an axial direction. The spool shaft 3 can be optionally slid in the axial direction through the action of a cam and so forth by turning an operating lever 6 provided at the side plate 4, in a conventional manner. This mechanism serves as a means for displacing the spool shaft in the axial direction. A driving gear 9 is operably secured to a handle shaft 8 and engages a pinion 7 which is fitted on the spool shaft 3 near the side plate 4 so that the pinion can be rotated when handle shaft 8 is turned.

A braking disk 11 is rotatably disposed on the spool shaft 3 and integrally secured to the pinion 7 near the spool 1. A braking member 10 is provided on the surface of disk 11 facing spool 1. A waterproofing cover 14 comprising a pan-shaped portion 13 and a lid-shaped portion 13' is fitted with seals 15 on axial cylindrical portion 12 of the braking disk 11 so that waterproofing cover 14 can be optionally moved in the axial direction and rotated. A braking member 16 is provided on the pan-shaped portion 13 of the waterproofing cover 14 and faces the other braking member 10.

Coupling members 17 and 18, each having a large coefficient of friction, are provided on the outside surface of the pan-shaped portion 13 of the waterproofing cover 14 and an adjacent surface of the spool 1, respectively, so that the cover and the spool can be frictionally, operatively coupled to each other.

Figure 2:
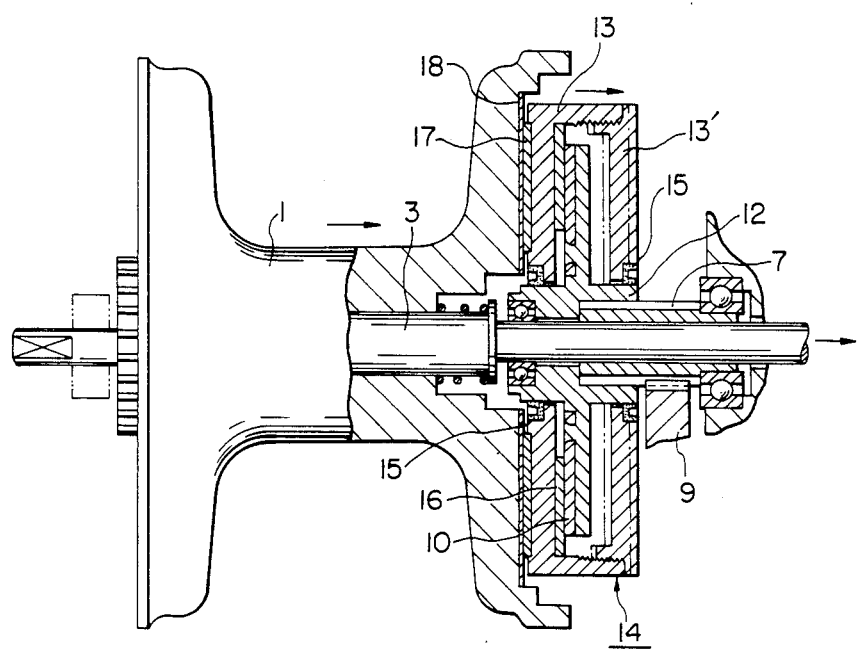
FIG. 2 shows a cutaway front view of a major part of the embodiment.

When a fishing line is to be wound by the fishing reel, the operating lever 6 is turned to slide the spool shaft 3 toward the side plate 4 to frictionally couple the spool 1 to the waterproofing cover 14 and the cover is then pressed to bring the braking member 16 into pressure contact with the other braking member 10 on the braking disk 11 as shown in FIG. 2. The spool 1 and shaft 3 are displaced to the right in FIG. 2. When the handle shaft 8 is thereafter rotated, the rotation is transmitted to the spool 1 through the driving gear 9, the pinion 7, the braking disk 11, the braking members 10 and 16, the waterproofing cover 14 and the coupling members 17 and 18 so that the fish line is wound onto spool 1.

When the braking action of the drag mechanism is to be regulated, the operating lever 6 is turned to slide the spool shaft 3 in the axial direction thereof to increase or decrease the degree of the pressure contact of braking members 10 and 16.

When the fish line is to be unwound from the fishing reel, the coupling members 17 and 18 are separated from each other by the operating lever 6 as shown in FIG. 1.

Although the embodiment is applied to the fishing reel in which the spool shaft 3 is supported at both ends and the spool is rotated together with the spool shaft 3, the invention is not confined to that application but may be applied to a fishing reel in which a spool shaft is supported at both the ends thereof and a spool is rotatably supported by a bearing on the spool shaft.

Figure 3:
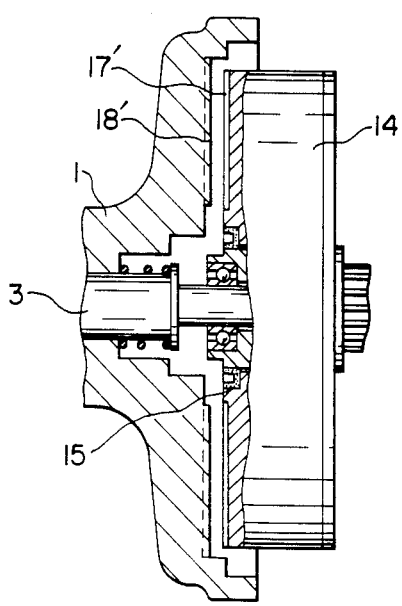
FIG. 3 shows a cutaway front view of a major part of a second embodiment of the present device.

As shown in FIG. 3, the waterproofing cover 14 and the spool 1 may be provided with recesses 17' and projections 18', respectively, instead of the coupling members 17 and 18, so that the outside surface of the waterproofing cover 14 and the adjacent side surface of the spool 1 can be coupled to each other.

Figure 4:
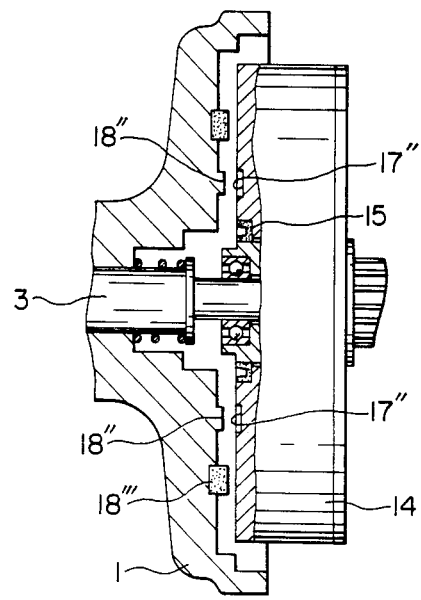
FIG. 4 shows a cutaway front view of a major part of a third embodiment of the present device.

As shown in FIG. 4, the waterproofing cover 14 may be provided with a recess 17" and the spool 1 may be provided with a projection 18" and an elastic material 18" such as rubber, which has a large coefficient of friction and is located on the side surface of the spool so as to come into pressure contact with the waterproofing cover, instead of the coupling members 17 and 18, so that the outside surface of the waterproofing cover and the side surface of the spool can be coupled to each other.

Figure 5:
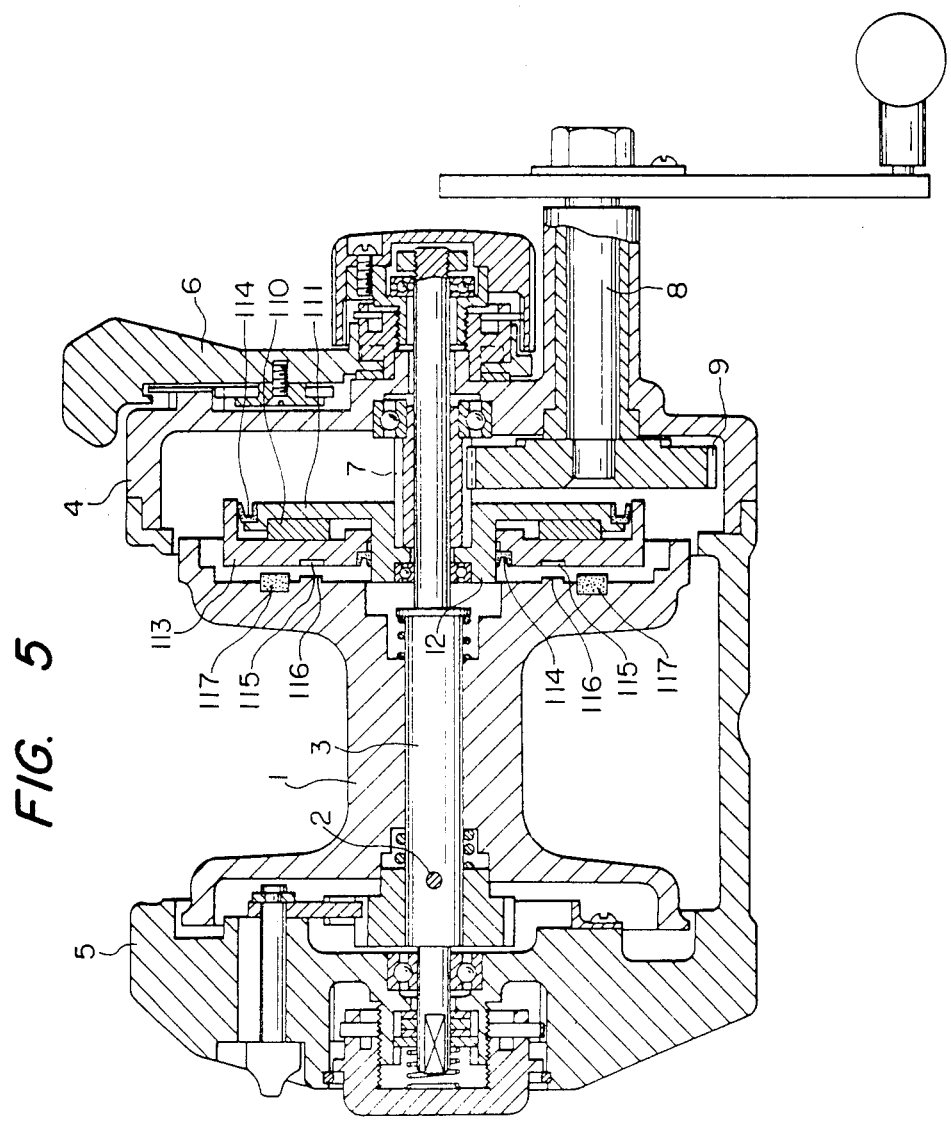
FIG. 5 shows the embodiment of FIG. 4 with an additional embodiment of the waterproofing member and drag mechanism.

FIG. 5 shows the embodiment of FIG. 4 with an additional embodiment of the waterproofing member and drag mechanism. In this embodiment, a pan-shaped braking member 113 is fitted on the axial cylindrical portion of the braking disk 111 near the spool 1. Braking member 113 can be optionally moved in the axial direction and rotated with respect to the braking member 111. Member 111 is provided with a member 110 having a high coefficient of friction for engaging member 113.

Seals 114 are provided on the peripheral portions and axial portions of the braking disk 111 and the pan-shaped braking member 113. An engaging projection 116 and an elastic material 117, such as rubber, which has a large coefficient of friction are provided on the side surface of spool 1. Projection 116 engages corresponding notch 115 on member 113.

In a drag mechanism provided in accordance with the present invention, for a fishing reel having a spool shaft supported at both the ends, a braking disk is housed in a waterproof manner in a waterproofing cover. The outside surface of the waterproofing cover faces the side surface of a spool so that the outside surface of the cover can be optionally coupled to the side surface of the spool. The braking member is provided in the waterproofing cover so that the braking member is located in a pressure contact with the braking disk. As a result, the braking section of the drag mechanism is completely waterproofed by the waterproofing cover to prevent the braking function and durability of the drag mechanism from failing when water is directly poured on the fishing reel to wash it or the reel is accidentally dropped into water. Since the waterproofing cover is separated from the spool so that only the spool is rotated when a fish line is unwound from the fishing reel, the rotative inertia of the spool is not increased as is done in conventional fishing reels. For that reason, the fish line does not backlash so that the casting performance of the fishing reel is not deteriorated. Desirable features and practicality are thus achieved.

We claim:

1. A fishing reel having a waterproof drag mechanism, comprising:
   a spool shaft having a length, first and second ends and defining an axial direction along said length;
   first means for rotatably supporting both ends of said shaft;
   second means for displacing said shaft in the axial direction;
   a spool for having fishing line wound thereon having two sides and fixed to said shaft;
   a handle;
   means for operably connecting said handle to said shaft, whereby torque is transmitted from said handle to said shaft;

a braking member rotatably disposed on said shaft adjacent one side of said spool;

a waterproofing member axially displaceably and rotatably, and watertightly disposed on said axle for sealing said braking member from exposure to water, and having a surface adjacent said one side of the spool for engaging the spool;

wherein said means for displacing the shaft is operable from a first position wherein the spool rotates with the shaft, to a second position wherein the waterproofing member engages the one side of the spool and rotates with the spool to a third position wherein said braking member engages said waterproofing member.

2. A fishing reel according to claim 1 wherein said braking member comprises a disk having a periphery, fixed to said shaft at an intermediate point on said shaft and displaced from said one side of the spool, radiating out from said axle, and having a braking surface for engaging said waterproofing member when said axle is in the third position.

3. A fishing reel according to claim 2 wherein said waterproofing member comprises a pan-shaped member rotatably and watertightly disposed on said axle between the braking member and the spool, having a surface for engaging said braking surface when said axle is in the third position, and having means for water tightly sealing said braking surface while allowing free relative rotation between said braking member and said water proofing member.

4. A fishing reel according to claim 3, wherein said means for watertightly sealing comprises a lid-shaped member rotatably and watertightly disposed on said axle and fixed to said pan-shaped member, wherein said braking member is freely rotatable within a watertight space defined by said lid-shaped and pan-shaped members when said axle is in the first and second positions.

5. A fishing reel according to claim 2, wherein said means for water-tightly sealing comprises a seal member extending from a peripheral edge of said pan-shaped member to said periphery of the disk and defining a water tight space between the pan-shaped member and the braking surface.

6. A fishing reel according to claim 2, wherein said braking surface comprises a material having a high coefficient of friction for engaging said water-proofing member when the axle is in the third position.

7. A fishing reel according to claim 10 wherein said water-proofing member comprises a material having a high coefficient of friction for engaging said braking member when the axle is in the third position.

8. A fishing reel according to claim 1 wherein said surface adjacent to one side of the spool for engaging the spool comprises a member having a high coefficient of friction for engaging the spool.

9. A fishing reel according to claim 8, wherein said one side of the spool also comprises a material having a high coefficient of friction.

10. A fishing reel according to claim 1, wherein one of said side adjacent the spool and said one side of the spool comprises protrusions for engaging corresponding notches on the other of said sides.

11. A fishing reel according to claim 10, further comprising an elastic material on one of said sides having a large coefficient of friction for engaging the other of said sides.

12. A fishing reel having a waterproof drag mechanism, comprising:

a spool shaft having a length, first and second ends and defining an axial direction along said length;

first means for rotatably supporting both ends of said shaft;

second means for displacing said shaft in the axial direction;

a spool for having fishing line wound thereon having two sides and rotatably disposed on said shaft;

a handle;

means for operably connecting said handle to said shaft, whereby torque is transmitted from said handle to said shaft;

a braking member rotatably disposed on said shaft adjacent one side of said spool;

a waterproofing member axially displaceably and rotatably, and watertightly disposed on said axle for sealing said braking member from exposure to water, and having a surface adjacent said one side of the spool for engaging the spool;

wherein said means for displacing the shaft is operable from a first position wherein the spool rotates freely about the shaft, to a second position wherein the waterproofing member engages the one side of the spool and rotates with the spool, to a third position wherein said braking member engages said waterproofing member and thereby transfers torque from the handle to the spool.

* * * * *